United States Patent
Nayshtut et al.

(10) Patent No.: US 11,126,721 B2
(45) Date of Patent: Sep. 21, 2021

(54) METHODS, SYSTEMS AND APPARATUS TO DETECT POLYMORPHIC MALWARE

(71) Applicant: Intel Corporation, Santa Clara, CA (US)

(72) Inventors: Alex Nayshtut, Gan Yavne (IL); Vadim Sukhomlinov, Santa Clara, CA (US); Koichi Yamada, Los Gatos, CA (US); Ajay Harikumar, San Jose, CA (US); Venkat Gokulrangan, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 264 days.

(21) Appl. No.: 16/021,411

(22) Filed: Jun. 28, 2018

(65) Prior Publication Data

US 2019/0042746 A1   Feb. 7, 2019

(51) Int. Cl.
*H04L 29/06* (2006.01)
*G06F 21/56* (2013.01)
*G06F 21/55* (2013.01)

(52) U.S. Cl.
CPC .......... *G06F 21/566* (2013.01); *G06F 21/554* (2013.01); *G06F 21/565* (2013.01); *G06F 21/567* (2013.01); *G06F 21/568* (2013.01); *G06F 2221/033* (2013.01)

(58) Field of Classification Search
CPC .... G06F 21/566; G06F 21/567; G06F 21/568; G06F 21/554; G06F 2221/033
See application file for complete search history.

(56) References Cited

U.S. PATENT DOCUMENTS

| | | | | |
|---|---|---|---|---|
| 7,581,252 B2* | 8/2009 | Challener | ............ | G06F 21/567 726/22 |
| 7,854,008 B1* | 12/2010 | Huang | .................. | G06F 21/564 726/24 |
| 7,917,954 B1* | 3/2011 | Zaitsev | ............... | G06F 11/3051 726/23 |
| 2004/0225885 A1* | 11/2004 | Grohoski | ............. | H04L 63/164 713/189 |

(Continued)

OTHER PUBLICATIONS

Alam, Manaar, et al. "Performance Counters to Rescue: A Machine Learning based safeguard against Micro-architectural Side-Channel-Attacks." IACR Cryptol. ePrint Arch. 2017 (2017): 564. (Year: 2017).*

*Primary Examiner* — Shawnchoy Rahman
(74) *Attorney, Agent, or Firm* — Spectrum IP Law Group LLC (57) ABSTRACT

The disclosed embodiments generally relate to detecting malware through detection of micro-architectural changes (morphing events) when executing a code at a hardware level (e.g., CPU). An exemplary embodiment relates to a computer system having: a memory circuitry comprising an executable code; a central processing unit (CPU) in communication with the memory circuitry and configured to execute the code; a performance monitoring unit (PMU) associated with the CPU, the PMU configured to detect and count one or more morphing events associated with execution of the code and to determine if the counted number of morphine events exceed a threshold value; and a co-processor configured to initiate a memory scan of the memory circuitry to identify a malware in the code.

27 Claims, 5 Drawing Sheets

(56) References Cited

U.S. PATENT DOCUMENTS

| | | | |
|---|---|---|---|
| 2005/0223239 A1* | 10/2005 | Dotan | G06F 21/554 |
| | | | 713/188 |
| 2006/0123244 A1* | 6/2006 | Gheorghescu | G06F 21/563 |
| | | | 713/188 |
| 2009/0044273 A1* | 2/2009 | Zhou | G06F 21/562 |
| | | | 726/24 |
| 2013/0152200 A1* | 6/2013 | Alme | G06F 21/52 |
| | | | 726/24 |
| 2015/0261954 A1* | 9/2015 | Xue | H04W 12/1208 |
| | | | 726/23 |
| 2016/0275288 A1* | 9/2016 | Sethumadhavan | |
| | | | H04L 63/0428 |
| 2018/0183814 A1* | 6/2018 | Sambandam | G06F 21/565 |
| 2019/0042745 A1* | 2/2019 | Chen | G06F 21/54 |

* cited by examiner

METHODS, SYSTEMS AND APPARATUS TO DETECT POLYMORPHIC MALWARE

FIELD

The disclosure generally relates to malware detection in a computation system. More specifically, the disclosure relates to detection of computer behavior associated with software polymorphism through analyzing CPU-level data counters.

BACKGROUND

Modern malware creators are highly innovative in rendering their malware undetectable by Anti-Malware software. Polymorphism is a technique used to evade detection. A polymorphic malware constantly self-modifies its code such that conventional signature-based detection ineffective. This, the malware may appear innocuous on the disk and on start-up. However, once launched the malware may morph into its malicious nature such as rootkit, ransomware, backdoor, etc. Researchers estimate that hundreds of thousands of unique ransomwares samples are formed from code built from only 12-15 different toolkits.

Conventional techniques for detecting polymorphic malware is persistent memory scanning for pattern recognition. Such techniques are exceptionally draining on the computer's performance as the can add as much as 80% to the processing overhead. Thus, there is a need for method and apparatus to detect polymorphic malware without substantially taxing the processor's performance.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "a computer system" can refer to a single computer or a plurality of computers working together to perform the function described as being performed on or by a computer system.

Increasingly, cyber-attacks on businesses, government agencies, and others are covert and persistent. As a result, the ability to detect covert communications becomes increasingly more important to being able to deal with threats to intellectual property and personal information theft.

A main element in covering the malware's tracks involves hiding from software resident in the operating system. A common method of avoiding detection is using malware that is able to hide activities from software such as anti-virus (AV) and host-based intrusion detection.

Contemporary threats pay more attention to hiding inside the operating system (e.g., rootkits and bootkits). Bootkits (i.e., rootkits that activate before operating system initiation during the boot process) can control the operating system's interaction with the network hardware. They can also manipulate the AV software installed on the system in order to exploit or disable AV protection. This renders the operating system and software operating under the operating system (including AV or other security software) incapable of seeing or stopping the malicious program activity. Rootkit code may also activate from firmware, which would make it harder to detect and significantly harder to remove.

There are multiple rootkit detection programs in the market, employing different methods. The methods of comparing trusted and potentially tainted information are well known and have been used in many anti-rootkit tools, such as the use of Difference-based detection by Russinovich's RootkitRevealer, which enabled detection of the Sony DRM rootkit. Other examples are F-Secure's Blacklight and McAfee's RootkitDetective, all of which use differential viewing as one of the main detection methods. However, the existing anti-rootkit solutions cannot reliably account for and identify previously unseen variants of known malware code or previously undiscovered malware code. These types of malware would be difficult, if not impossible, to detect using purely software-based, difference-based detection.

Polymorphism is another common technique for evading AV detection. Polymorphic malware constantly changes its identifiable features in order to evade detection. Many of the common forms of malware may be polymorphic. This includes viruses, worms, bots, trojans, or keyloggers. Polymorphic techniques require frequently changing identifiable characteristics such as file names, types or encryption keys to make the malware unrecognizable to AV software. Polymorphism can be used to evade pattern-matching detection relied on by security solutions of conventional AV software. Despite the changing characteristics of the polymorphic malware, its functional purpose remains the same. For example, a polymorphic virus will continue to spread and infect devices even if its signature changes to avoid detection. By changing characteristics to generate a new signature, signature-based detection solutions will not recognize the file as malicious. Even if the new signature is identified and added to antivirus solutions' signature database, polymorphic malware can continue to change signatures and carry out attacks without being detected.

Certain disclosed embodiments detect the morphing event of a software using hardware-level (HW-level) data from the CPU as a trigger for initiating memory inspection. Memory inspection may concern memory region or a process, which may be implemented by a processor external to the CPU. In certain embodiments, the processor may be external to the CPU while on the same die. Conventional methods interrupt the software by mediating the CPU which detract the CPU and slows processing. In one embodiment, an external scanner can run in parallel without affecting performance of open applications.

Self-modification functionality is likely to impact the control flow of the process and as the result to cause mis-predict in CPU branching, flushes of the execution pipeline, loads to instruction cache. This behavior can be recognized by behavioral detection solution such as those disclosed at application Ser. Nos. 14/707,977, 14/865,954 and 14/923,184 (the disclosure of which is incorporated herein in their entirety for background information) filed and assigned by the instant Applicant's assignee.

In one application, memory scanning initiated upon detection of suspicious behavior maybe offloaded to a graphic processor (e.g., GPU) or other external hardware devices. By way of example, memory buffers from the memory spaces of the suspicious process may be send to pattern recognition engine in a GPU.

In another embodiment, the memory scanning is time-limited to enhance user experience. In still another embodiment, memory scanning is configured to self-disable to enhance user experience. In yet another embodiment, mechanism to avoid scanning of already scanned memory can be used. In still another embodiment, special handling of newly-loaded code and just-in-time (JIT) codes are implemented to preserve user experience.

Computer Performance Monitoring Unit (PMU)

Conventional hardware performance counters, or hardware counters are a set of special-purpose registers built into microprocessors to store the counts of hardware-related activities within the computer system. Advanced users often rely on those counters to conduct low-level performance analysis or tuning.

Figure 1:
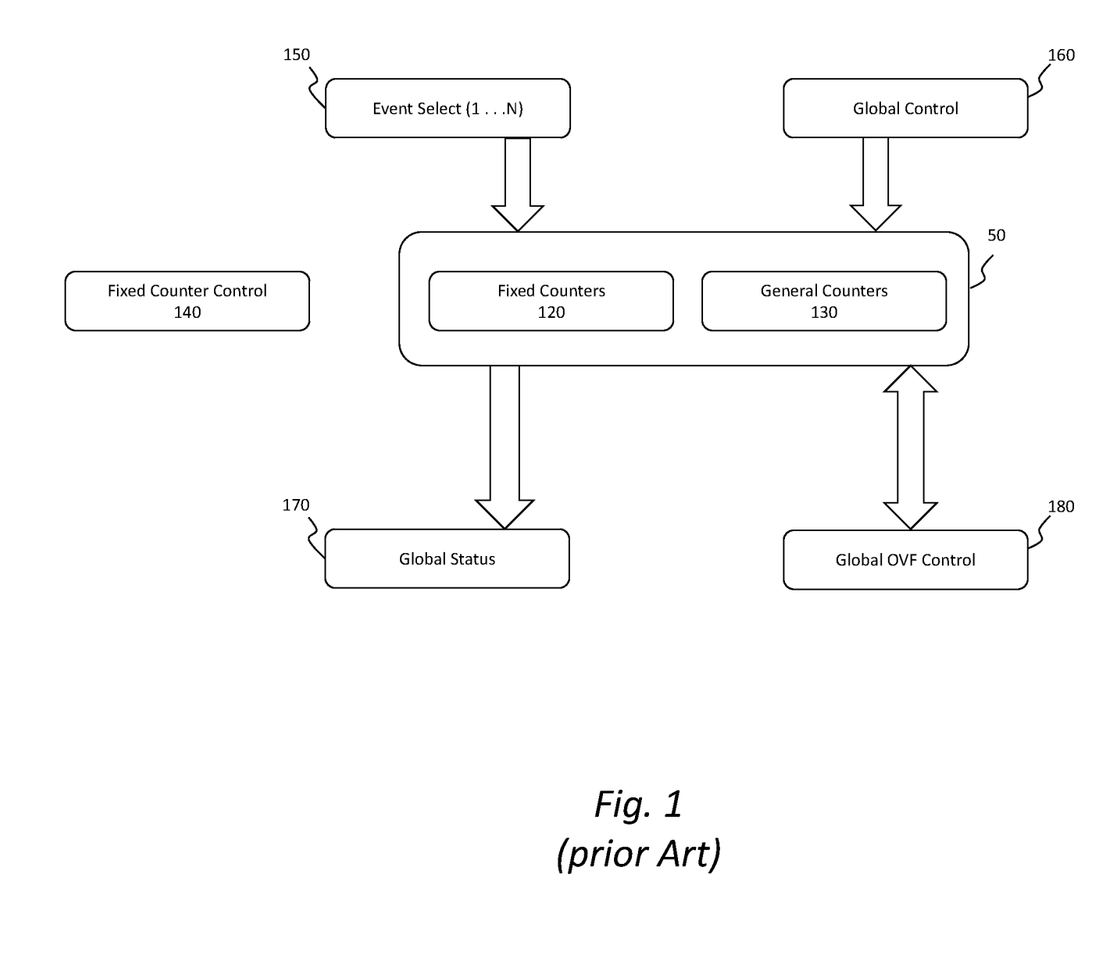
FIG. 1 schematically illustrates a Performance Monitoring Unit (PMU) which may be implemented in accordance to certain disclosed embodiments.

Modern computers have a Performance Monitoring Unit (PMU) for monitoring selected events. FIG. 1 schematically illustrates a core PMU and related registers 100 which may be implemented on Intel x86 processors. Processors from different manufacturers may have similar PMUs, although architectural details may differ. PMU 100 has a plurality of fixed purpose counters 120. Each fixed purpose counter 120 can count only one architectural performance event. In addition to the fixed purpose counters 120, the Core PMU also supports a plurality of general counters 130 that are capable of counting any activity occurring in the core. Each Core PMU 110 also has a set of control registers 140, 160, to assist with programming the fixed purpose counters 120 and general purpose counters 130. The PMU 110 also has Event Select registers 150 that correspond to each fixed purpose counter 120 and general purpose counter 130, which allow for specification of the exact event that should be counted. A global control register 160 allows enabling or disabling the counters 120, 130. A global register 170 allows software to query counter flow conditions on combinations of fixed purpose counters 120 and general purpose counters 130. A global overflow register 180 allows software to clear counter overflow conditions in any combination of fixed-purpose counters 120 and general purpose counters 130.

One of the ways the Event Select registers 150 may be configured is to cause the PMU 110 to count branch mis-predict events. These events may be caused by Return- and Jump-Oriented Programming ROP and JOP exploits, as well as for other reasons.

Modern processor architectures also provide a branch recording mechanism. Typically, the last branch recording mechanism tracks not only branch instructions (like JMP, Jcc, LOOP, and CALL instructions), but also other operations that cause a change in the instruction pointer, like external interrupts, traps, and faults. The branch recording mechanisms generally employ a set of processor model specific registers, referred to as a last branch record (LBR) stack, each entry of which stores a source address and a destination address of the last branch, thus the LBR stack provides a record of recent branches. Some embodiments of an LBR stack may also record an indication of whether the branch was mispredicted, i.e., one or more of the target of the branch and the direction (taken, not taken) was mispredicted. In addition, control registers may allow the processor to filter which kinds of branches are to be captured in the LBR stack.

Where branch capture filtering is available, the filter may be employed to limit the captured branches to those of interest in ROP or JOP exploits. For JOP exploits, the branches of interest are typically near indirect jumps. For ROP exploits, the branches of interest are typically CALLs or RETs. However, embodiments may filter other types of branches or do no branch capture filtering, if desired. For example, another type of exploit, known as call oriented programming (COP), uses gadgets that end with indirect CALL instructions In COP exploits, gadgets are chained together by pointing the memory-indirect locations to the next gadget in sequence COP exploits may be detected using a similar approach to that used for detecting ROP and JOP exploits, with the branches of interest being CALLs.

Triggering Event

During execution of certain programs, there are places where the program execution flow can continue in several different ways, each known as branches or conditional jumps. The CPU also uses a pipeline which allows several instructions to be processed at the same time. When the code for a conditional jump is read, the CPU does not yet know the next instruction to execute and insert into the execution pipeline. Branch prediction is aimed at expediting code execution at the CPU. Branch misprediction occurs when the CPU mispredicts the next instruction to be processed in branch prediction. Thus, branch prediction guesses the next instruction to execute and inserts the next assumed instruction to the pipeline. Guessing wrong is called branch misprediction. The partially processed instructions in the pipeline after the branch have to be discarded and the pipeline has to start over at the correct branch when a branch misprediction is detected. This slows down the program execution. A self-modifying code or polymorphic malware continually changes the underlying code thereby causing branch misprediction.

Return- and Jump-Oriented programming ("ROP" and "JOP") exploits are a growing threat for software applications. Such techniques allow an attacker to execute code even if security measures such as non-executable memory and code signing are used. In ROP, an attacker gains control of the call stack and then executes carefully chosen machine instruction sequences, called "gadgets." Each gadget typically ends in a return instruction and is code within an existing program (or library). Chained together via a sequence of carefully crafted return addresses, these gadgets allow an attacker to perform arbitrary operations. JOP attacks do not depend upon the stack for control flow, but use a dispatcher gadget to take the role of executing functional gadgets that perform primitive operations.

In one embodiment of the disclosure, branch misprediction (or a number of branch misprediction) at the CPU may be used to detect presence of polymorphic malware. For example, the PMU may be configured to detect branch mispredict (e.g., RET mispredict) as malware's unpacking code is now to exhibit ROP like behavior (e.g., causing a series of RET mispredict) and may combine this event to provide a strong indication of malware detection.

Figure 2:
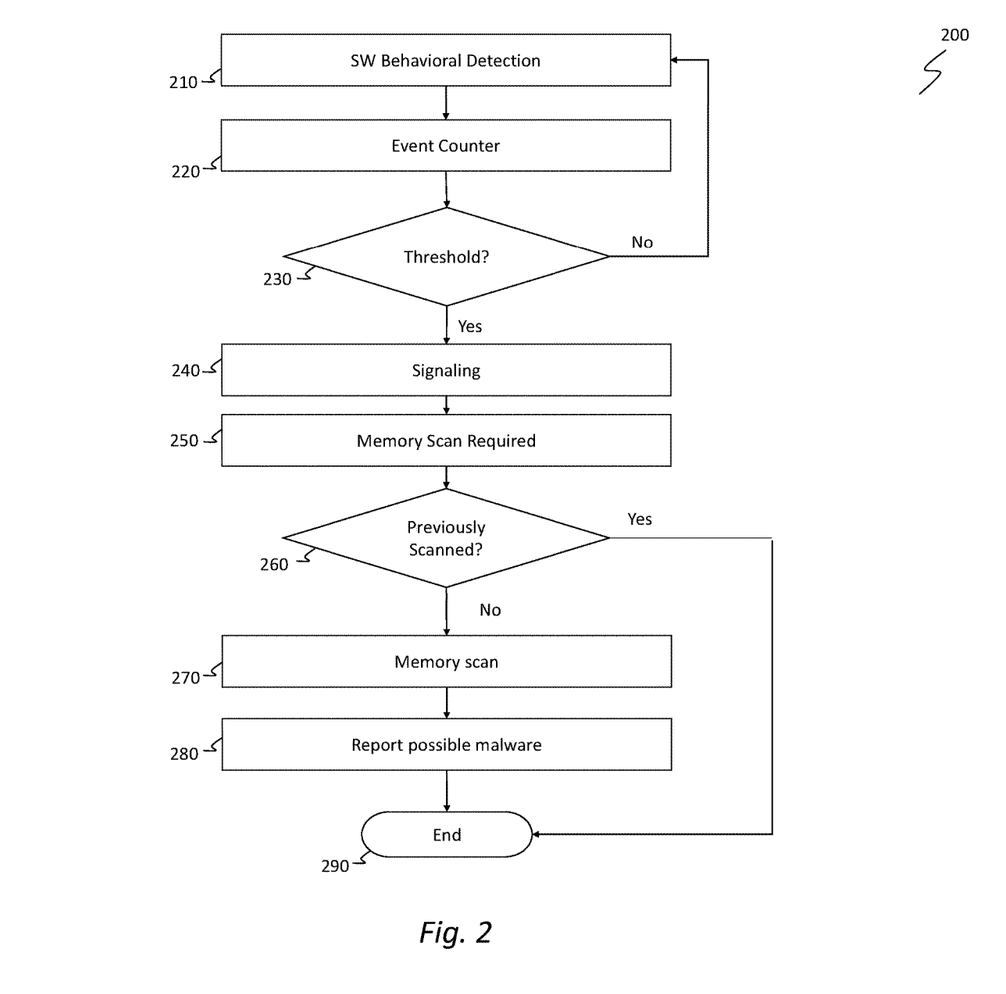
FIG. 2 is a flow diagram of an exemplary method according to one embodiment of the disclosure.

FIG. 2 is a flow diagram of an exemplary method according to one embodiment of the disclosure. Process 200 of FIG. 2 starts at step 210 where morphing at hardware level are detected. Such detection may be implemented at a PMU of the CPU. Such events may include detecting branch mispredict, ROP and JOP, writes to data in instruction cache and transfers from data cache to instruction cache, side-effects of self-modified code, like MACHINE_CLEARS.SMC on x86 among others.

In one embodiment of the disclosure, morphing may be detected and quantified by identifying the number of branch mispredicts at the CPU. For example, the PMU may be programmed to detect branch mispredict (e.g., RET mispredict) as malware indicia. Malware's unpacking code is generally known to exhibit ROP/JOP-like behavior which cause a series of RET mispredict. Thus, identifying such events can be a strong indication of malware presence.

At step 220, which may be implemented optionally, a branch mispredict event counter counts the number of CPU mispredicts. The number of mispredicts may be measured against a threshold and generate an interrupt, at step 230, to determine malware likelihood.

If the number of mispredicted events does not exceed the threshold value, the flow diagram resumes behavior detection and event counting as shown in FIG. 2. On the other hand, if the number of mispredicted events exceed the predetermined threshold, then the flow diagram continues to step triggering a signal (interrupt) at step 240.

The signal may be triggered to notify an external hardware device. In certain embodiments, the CPU generates interrupt signals to notify the system software that one of the above-mentioned event took place. At step 250 a decision is made to scan the memory or a region of the memory (or the process) to identify malware.

Signaling to external device (i.e., step 240) may be implemented in a number of different ways. For example, the software interrupts may be processed by the CPU (as is done for PMU interrupts). In another example, the hardware may receive notification directly through the interrupt signal, writes to MMIO, etc. This, making scanning transparent and independent from software environment and minimize attack plane. Extensions to PMU and device may allow signaling to device directly versus PMU-interrupt handler-device. One implementation may be using CPU Debug Store with Precise Event-Based Sampling (PEBS) which is a sampling feature of the Intel Core-based processors in which the processor is directly recording samples into a designated memory region). Thus, security device (external to CPU core) will have access to samples upon receiving interrupt event from PMU.

By way of example, Basic Input Output System (BIOS), Unified Extensible Firmware Interface (UEFI), firmware, pre-boot loader and OS can be used to program the external device (i.e., external to the CPU) to configure appropriate functionality. In one embodiment, software handler for the PMU interrupts (detected interrupts) may run transparent to the Operating Software and configured to run in System Management Interrupt (SMI) mode.

The interrupt signal may be transmitted to an external device (from the CPU or the main processor) to scan the affected memory. The system software may also reside on an external device with full memory access. For example, the system software may reside on a Graphic Processor Unit (GPU) connected via PCIe card (with enabled Direct Memory Access, DMA), Field-Programmable Gate Arrays (FPGA), Converged Security and Manageability Engine (CSME) or the like. In one embodiment, the external hardware device may comprise a co-processor, a Graphic Unit Processor (GPU) or any other processing device or circuity configurable to scan the memory circuitry for malware. In another embodiment, the external co-processor may be on the same die as the main CPU processor. Scanning may be performed independently of the main CPU to alleviate overhead to the main CPU.

Once the affected memory location is identified (e.g., at step 250), a mechanism akin to transactional memory can be used to mark specific memory region as a code and to generate exceptions if a write operation to this region is detected. The Operating System (OS) may then mark such regions upon the load of the application and its modules.

Memory protection is a way to control memory access rights on a computer. Memory page protection is common to modern instruction set architectures and operating systems. The purpose of memory protection is to generally prevent a process from accessing memory that has not been allocated to it. In one embodiment of the disclosure, the OS may signal a scan request (not shown in FIG. 2) based on memory page protection change requests received from the application. Such changes may include, for example, a request to change RW to RX in the application.

To prevent redundant scanning, at step 260, determination is made as to whether the memory scan of the desired region has been previously implemented. Here, a determination can be made as to whether a new scan is required (e.g., prior scanning was too remote in time) or that the region/process has not been scanned at all or not scanned recently. Other factors may also be considered when making a decision at step 260.

Referring again to FIG. 2, memory scanning may be implemented at step 270. As stated, memory scanning may be implemented at a device external to the CPU. Certain exemplary external devices are enumerated above. In this manner, scanning does not impact CPU performance other than by sharing memory and I/O bandwidths (BWs). Depending on implementation, the overhead may be rather small due to use of cache-hints or Data Direct I/I (DDIO) and read from CPU cache whenever data is available.

Additional measures may be taken to minimize the need or the overhead for scanning of step 270. For example, system and process memory map information (location of processes, modules, heap in the memory) and hashes of memory regions may be scanned. Page table information may be used to find modified memory ranges (e.g., WRX). Whitelisting of processes or address ranges which have been previously scanned and verified may be used to limit scanning.

Finally, repetitive scanning of already scanned and unmodified regions of memory may be eliminated by reference to previously scanned and unaffected memory regions. To achieve this, the external device may be provided with address where page table is located.

At step 280, the flow diagram reports possible detection of the possible malware. Upon detecting suspicions code external security device may notify the software agent via interrupts shred memory (MIMO) on violation and invoke remedial action. The remedial action may comprise executing an antivirus software or other software (or patches) to eliminate the malware. Such software may be implemented specific to the OS or other specific environment.

The process ends at step 290. Alternatively, the process may run iteratively while a particular application or software is active.

Figure 3:
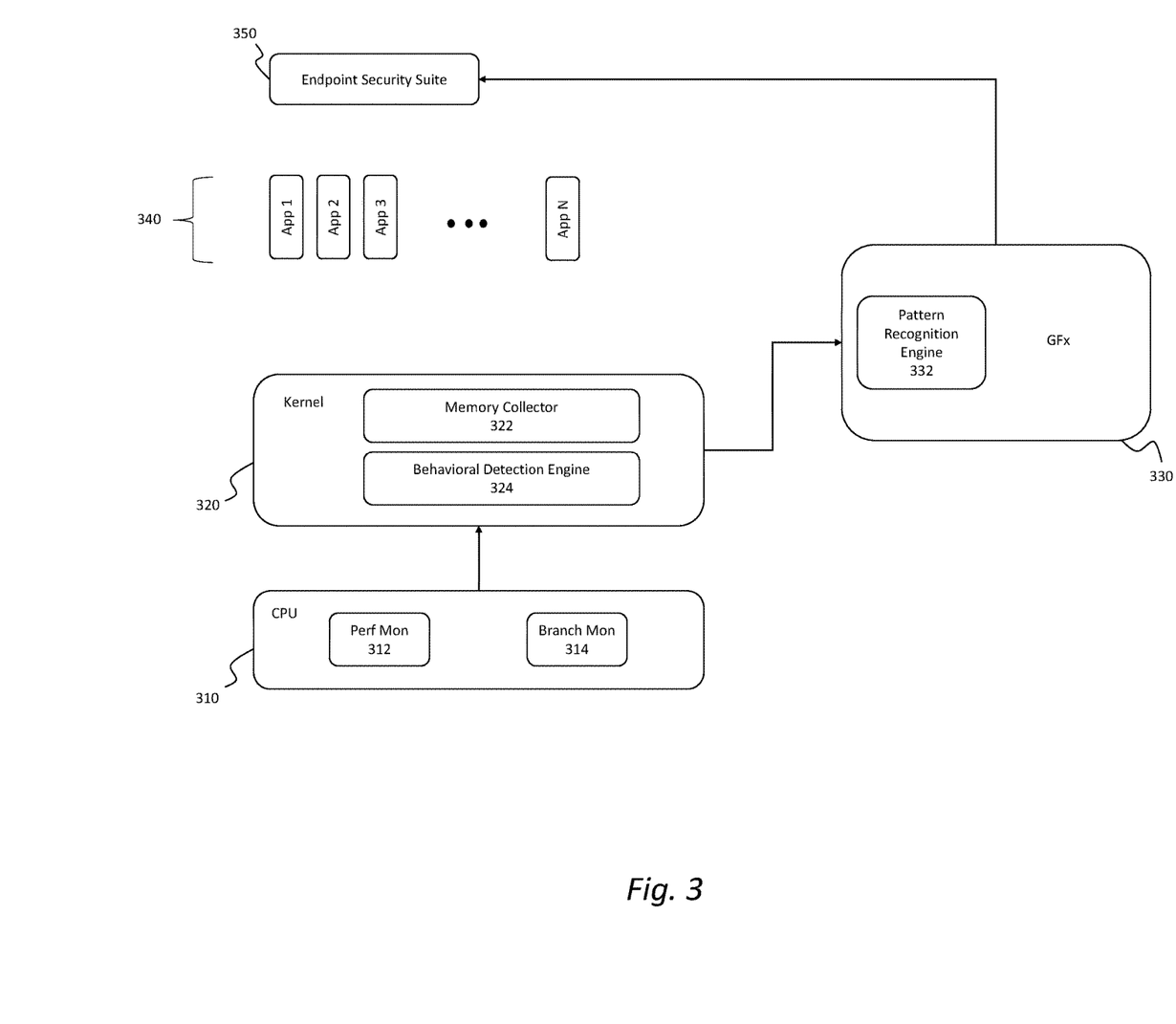
FIG. 3 schematically illustrates a system architecture according to one embodiment of the disclosure.

FIG. 3 schematically illustrates a system architecture according to one embodiment of the disclosure. The system of FIG. 3 includes CPU 310. CPU 310 is shown with performance monitor 312 and branch monitor/predictor 314. While CPU 310 includes other components, for simplicity, the other components are omitted from this illustration. Performance monitor 312 may detect and count performance misprediction. Branch monitor 314 may monitor, predict and count cache or branch misprediction. Performance monitor 312 and branch monitor 314 may collectively provide data as a PMU. A branch monitor is composed of 2 parts—predictor and monitor. Predictor uses history of branch behavior, hints to predict where branch would direct before actual execution of branch to support speculative execution. Monitor compares the actual branch destination with predicted, and in case of mismatch, will increase internal counter for mispredicted events, further collected by PMU.

In an exemplary embodiment, CPU 310 with PMU (312, 314) can detect and count microarchitectural events associated with self-modified code. For example, CPU 310 may write to data which is in instruction cache (not shown). The CPU may branch to address which is in data cache and not in instruction cache. Finally, the CPU may transfer from data cache (not shown) to instruction cache (not shown). The latter may be also valid when application is loaded into memory, which is extreme case of malware self-modification. The side effects of self-modified code (e.g., MACHINE_CLEARS.SMC on x86) which counts the number of self-modifying code that the machine clears may be detected.

Mispredict information from CPU 310 may be counted and reported to Kernel 320 through interrupt. For simplicity, Kernel 320 is shown with behavioral detection engine 324 and memory collector 322. Behavioral detection engine may analyze which events caused an interrupt, what code was executed and what memory was affected. Memory collection engine builds a list of affected memory ranges, modified pages and provides this in Pattern Recognition engine.

Data from Kernel 320 is directed to graphic processor 330. The data may comprise one or more interrupt signal as discussed above. Graphic processor 330 may comprise processor circuitries and memory circuitries to, among others, provide co-processing capabilities to CPU 310 so as to enable detecting malware without substantially increasing the CPU's processing overhead. While FIG. 3 shows graphics processor 330, any co-processor may be used without departing from the disclosed principles.

Pattern recognition engine 332 may be hardware, software or a combination of hardware and software. Pattern recognition engine 332 may be configured to receive interrupt information from Kernel 320, identify affected memory space(s) and detect presence of malware in such space(s). Once affected memory space is identified and the potential presence of malware is determined, the affected memory space may be reported to endpoint security suite 350. This may be seen as mechanism for notification of software agents (e.g., antivirus software aboud detection of suspicious code by Graphics processor (or co-processor) 330. Endpoint security suite 350 may then search the affected memory space and deal with the morphing virus according to its protocol.

The disclosed embodiments do not require scanning the entire memory to detect the malware. The disclosed embodiments also do not add overhead to the CPU. Moreover, the executing of the proposed detection techniques do not prevent operation of the various applications 340 as the pattern recognition engine 332 may operate in the background without affecting the main CPU's operation.

Figure 4:
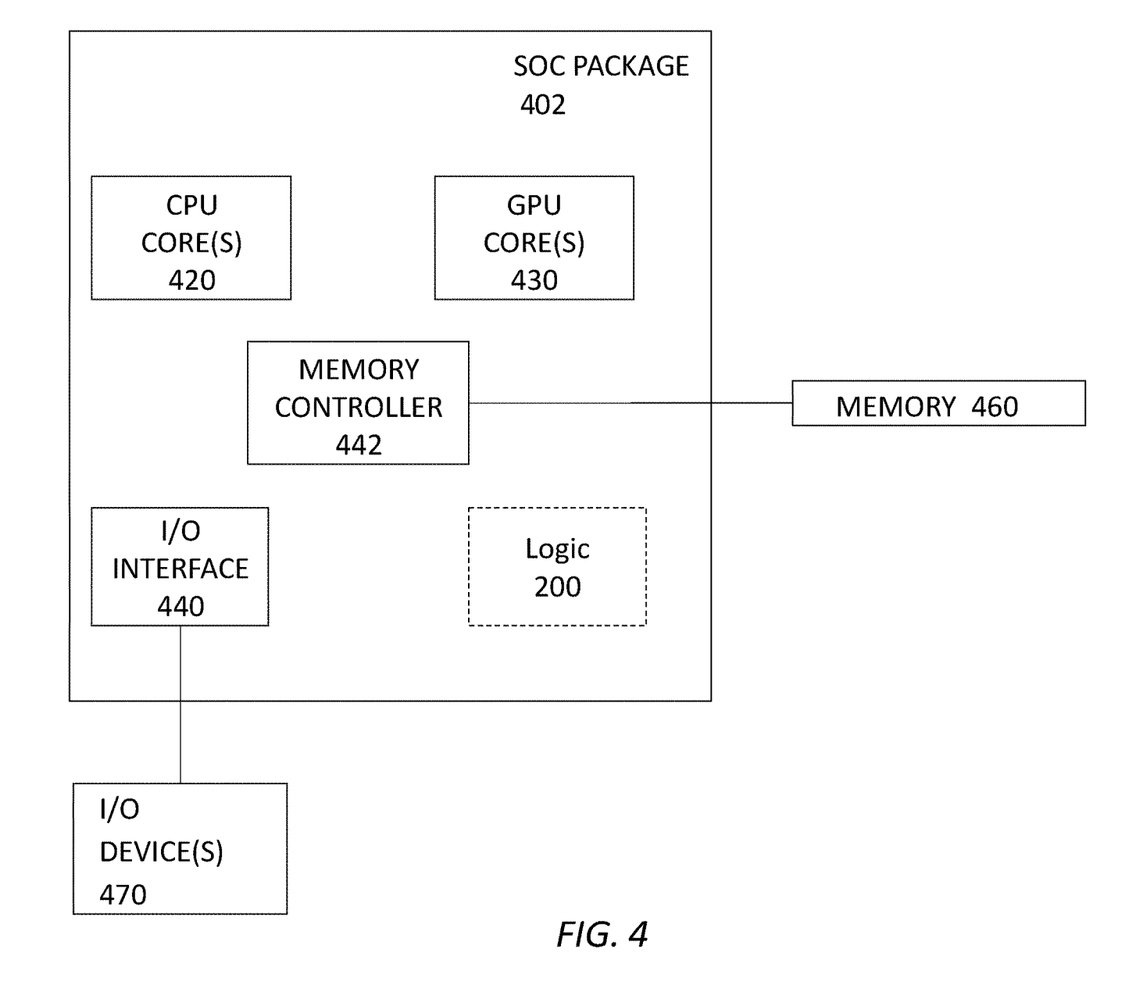
FIG. 4 illustrates an exemplary System-On-Chip ("SOC") apparatus according to one embodiment of the disclosure.

Certain disclosed embodiments may be implemented as a System-on-Chip (SOC). FIG. 4 illustrates a block diagram of an SOC package in accordance with an embodiment. As illustrated in FIG. 4, SOC 402 includes one or more Central Processing Unit (CPU) cores 420, one or more GPU cores 430, an Input/Output (I/O) interface 440, a memory controller 442 as well as logic 200.

Various components of the SOC package 402 may be coupled to an interconnect or bus such as discussed herein with reference to the other figures. Also, the SOC package 402 may include more or less components, such as those discussed herein with reference to the other figures. Further, each component of the SOC package 420 may include one or more other components, e.g., as discussed with reference to the other figures herein. In one embodiment, SOC package 402 (and its components) is provided on one or more Integrated Circuit (IC) die, e.g., which are packaged into a single semiconductor device.

As illustrated in FIG. 4, SOC package 402 is coupled to a memory 460 via the memory controller 442. In an embodiment, the memory 460 (or a portion of it) can be integrated on the SOC package 402.

The I/O interface 440 may be coupled to one or more I/O devices 470, e.g., via an interconnect and/or bus such as discussed herein with reference to other figures. I/O device(s) 470 may include one or more of a keyboard, a mouse, a touchpad, a display, an image/video capture device (such as a camera or camcorder/video recorder), a touch screen, a speaker, or the like. Logic 200 may be used to implement the exemplary processes disclosed herein (e.g., process 200 of FIG. 2).

Figure 5:
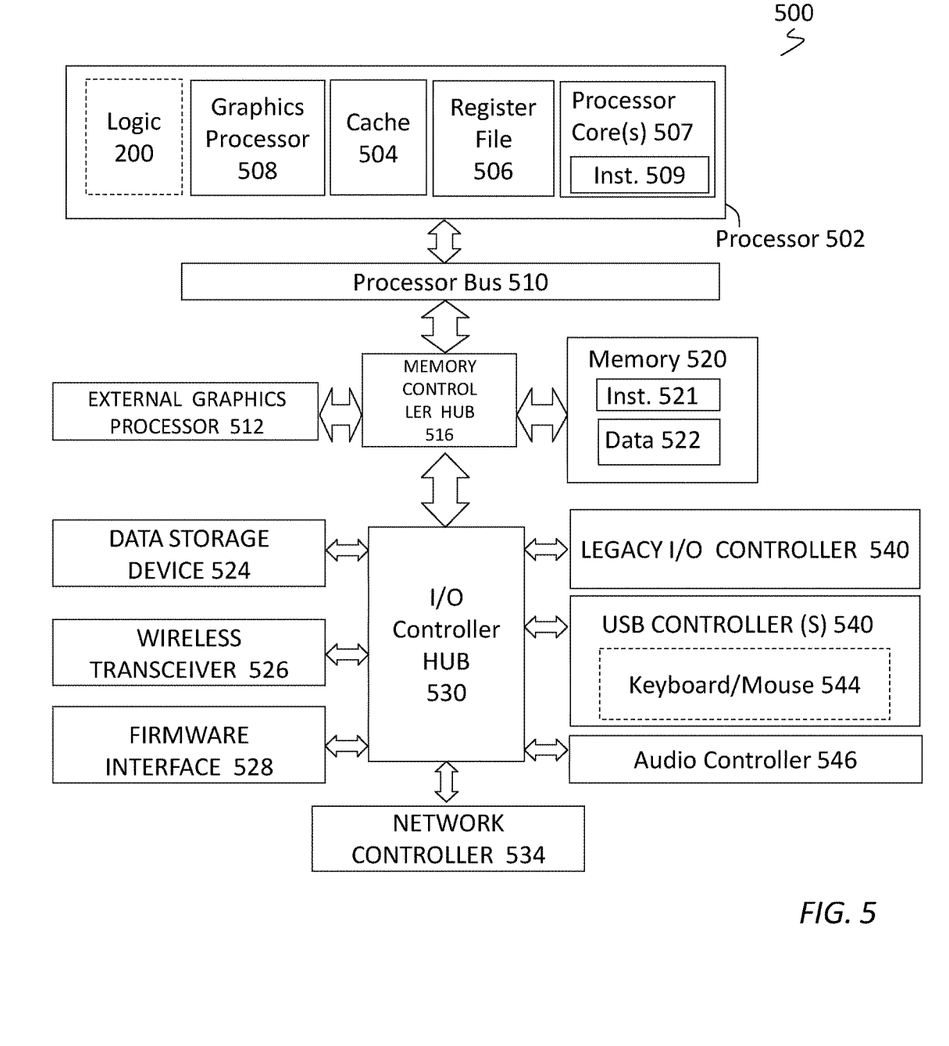
FIG. 5 is a block diagram of a processing system 1100, according to an embodiment.

FIG. 5 is a block diagram of another system according to an embodiment of the disclosure. In various embodiments the system 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within an SOC or integrated circuit for use in mobile, handheld, or embedded devices.

An embodiment of system 500 can include, or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508. Logic 200 may be optionally used to implement one or more of disclosed embodiments. While logic 200 is shown in relation to processor 502, it may be placed or implemented at other locations in system 500.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, processor 502 is coupled to a processor bus 510 to transmit communication signals such as address, data, or control signals between processor 502 and other components in system 500. In one embodiment the system 500 uses an exemplary 'hub' system architecture, including a memory controller hub 516 and an Input Output (I/O) controller hub 530. A memory controller hub 516 facilitates communication between a memory device and other components of system 500, while an I/O Controller Hub (ICH) 530 provides connections to I/O devices via a local I/O bus. In one embodiment, the logic of the memory controller hub 516 is integrated within the processor.

Memory device 520 can be a dynamic random access memory (DRAM) device, a static random access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations.

In some embodiments, ICH 530 enables peripherals to connect to memory device 520 and processor 502 via a high-speed I/O bus. The I/O peripherals include, but are not limited to, an audio controller 546, a firmware interface 528, a wireless transceiver 526 (e.g., Wi-Fi, Bluetooth), a data storage device 524 (e.g., hard disk drive, flash memory, etc.), and a legacy I/O controller 540 for coupling legacy (e.g., Personal System 2 (PS/2)) devices to the system. One or more Universal Serial Bus (USB) controllers 542 connect input devices, such as keyboard and mouse 544 combinations. A network controller 534 may also couple to ICH 530. In some embodiments, a high-performance network controller (not shown) couples to processor bus 510. It will be appreciated that the system 500 shown is exemplary and not limiting, as other types of data processing systems that are differently configured may also be used. For example, the I/O controller hub 530 may be integrated within the one or more processor 502, or the memory controller hub 516 and I/O controller hub 530 may be integrated into a discreet external graphics processor, such as the external graphics processor 512.

ADDITIONAL NOTES & EXAMPLES

The following exemplary and non-limiting embodiments are provided to further illustrated the disclosed principles.

Example 1 is directed to a computer system, comprising: a memory circuitry comprising an executable code; a central processing unit (CPU) in communication with the memory circuitry and configured to execute the code; a performance monitoring unit (PMU) associated with the CPU, the PMU configured to detect and count one or more micro-architectural morphing events associated with execution of the code and to determine if the counted number of micro-architectural morphine events exceed a threshold value; and a co-processor configured to initiate a memory scan of the memory circuitry to identify a malware in the code.

Example 2 is directed to the computer system of example 1, wherein the co-processor is one of a Graphic Processor Unit (GPU), Field-Programmable Gate Arrays (FPGA), Converged Security and Manageability Engine (CSME) or a dedicated Security Offloading Co-processor.

Example 3 is directed to the computer system of example 1, wherein the co-processor is configured to signal an antivirus program residing on the memory circuitry when the malware is detected.

Example 4 is directed to the computer system of example 1, wherein the micro-architectural morphing event comprises a branch misprediction, a Return- or Jump-Oriented programming event, machine pipeline resets, writes to data in instruction-cache.

Example 5 is directed to the computer system of example 1, wherein the co-processor is configured to scan a memory space at one or more memory locations substantially corresponding to the code causing the morphing event.

Example 6 is directed to the computer system of example 1, wherein the co-processor is configured not to scan a previously-scanned memory region.

Example 7 is directed to the computer system of example 1, wherein the co-processor is configured to scan a newly-added code or a Just-In-Time code apriori.

Example 8 is directed to the computer system of example 1, wherein the co-processor is configured to limit the scan duration or to terminate the scan after a duration.

Example 9 is directed to a non-transitory machine-readable medium with instructions stored thereon that when executed, the instructions cause a programmable device to: detect one or more micro-architectural morphing events of a code at a processor; count occurrence of the one or more micro-architectural morphing events to determine if a morphing threshold value is met; if the morphing threshold value is met, scan a memory space at one or more memory locations substantially corresponding to the code to detect a malware presence; generate a signal to notify an antivirus software of the identified malware; wherein the memory space is scanned by a co-processor and wherein the processor and the co-processor are functionally coupled.

Example 10 is directed to the medium of example 9, wherein the micro-architectural morphing event is triggered at a hardware-level of the processor.

Example 11 is directed to the medium of example 9, wherein the programmable device is further programmed with instructions to monitor performance of the processor as caused by the one or more morphing events.

Example 12 is directed to the medium of example 9, wherein the one or more morphing event comprises a branch misprediction, an Return- or Jump-Oriented programming event, machine pipeline resets, writes to data in instruction-cache.

Example 13 is directed to the medium of example 9, wherein the programmable device is further programmed with instructions to scan the memory space through an independent co-processor.

Example 14 is directed to the medium of example 13, wherein the co-processor is programmed with instructions to avoid scanning previously-scanned memory.

Example 15 is directed to the medium of example 9, wherein the co-processor is further programmed with instructions to scan a newly-added code or a Just-In-Time code apriori.

Example 16 is directed to the medium of example 9, wherein the co-processor is further programmed with instructions to limit the scan duration or to terminate the scan after a time period.

Example 17 is directed to the medium of example 9, wherein the co-processor is one of a Graphic Processor Unit (GPU), Field-Programmable Gate Arrays (FPGA), Converged Security and Manageability Engine (CSME) or a dedicated Security Offloading Co-processor.

Example 18 is directed to the medium of example 9, wherein the signal to notify an antivirus software is an interrupt signal.

Example 19 is directed to the medium of example 9, wherein the co-processor is configured to limit the scan duration or to terminate the scan after a duration.

Example 20 is directed to a method to detect presence of a malware in a program code, the method comprising: detecting one or more micro-architectural morphing events of the code at a central processing unit (CPU); counting occurrence of the one or more micro-architectural morphing events at the CPU to determine if a micro-architectural morphing threshold value is met; if the micro-architectural morphing threshold value is met, scanning, using a co-processor, a memory space at one or more memory locations substantially corresponding to the code to detect a malware presence; and generating an interrupt signal to notify an antivirus software of the identified malware.

Example 21 is directed to the method of example 20, wherein the co-processor is one of a Graphic Processor Unit (GPU), Field-Programmable Gate Arrays (FPGA), Converged Security and Manageability Engine (CSME).

Example 22 is directed to the method of example 20, further comprising the co-processor signaling an antivirus program when detecting the malware.

Example 23 is directed to the method of example 20, wherein the micro-architectural morphing event comprises a branch misprediction, an Return- or Jump-Oriented programming event, machine pipeline resets, writes to data in instruction-cache.

Example 24 is directed to the method of example 20, further comprising scanning a memory space at one or more memory locations substantially corresponding to the code causing the micro-architectural morphing event.

Example 25 is directed to the method of example 20, further comprising not scanning a previously-scanned memory region.

Example 26 is directed to the method of example 20, further comprising scanning a newly-added code or a Just-In-Time code apriori.

Example 27 is directed to the method of example 20, further comprising limiting the scanning duration or terminating the scanning after a duration.

While the principles of the disclosure have been illustrated in relation to the exemplary embodiments shown herein, the principles of the disclosure are not limited thereto and include any modification, variation or permutation thereof.

What is claimed is:

1. A computer system to detect presence of micro-architectural morphing malware, the system comprising:
   a memory circuitry comprising an executable code;
   a central processing unit (CPU) in communication with the memory circuitry and configured to execute the code;
   a performance monitoring unit (PMU) associated with the CPU, the PMU configured to detect and count one or more micro-architectural morphing events using hardware level data associated with execution of the code at the CPU and to determine if the counted number of micro-architectural morphine events exceed a threshold value; and
   a co-processor configured to initiate a memory scan of the memory circuitry to identify a malware in the code;
   wherein the co-processor is external to the CPU while being on the same die as the CPU; and
   wherein a branch misprediction is used to detect the one or more micro-architectural morphing events.

2. The computer system of claim 1, wherein the co-processor is one of a Graphic Processor Unit (GPU), Field-Programmable Gate Arrays (FPGA), Converged Security and Manageability Engine (CSME) or a dedicated Security Offloading Co-processor.

3. The computer system of claim 1, wherein the co-processor is configured to signal an antivirus program residing on the memory circuitry when the malware is detected.

4. The computer system of claim 1, wherein the micro-architectural morphing event comprises a branch misprediction, a Return- or Jump-Oriented programming event, machine pipeline resets, writes to data in instruction-cache.

5. The computer system of claim 1, wherein the co-processor is configured to scan a memory space at one or more memory locations substantially corresponding to the code causing the morphing event.

6. The computer system of claim 1, wherein the co-processor is configured not to scan a previously-scanned memory region.

7. The computer system of claim 1, wherein the co-processor is configured to scan a newly-added code or a Just-In-Time code apriori.

8. The computer system of claim 1, wherein the co-processor is configured to limit the scan duration or to terminate the scan after a duration.

9. A non-transitory machine-readable medium with instructions stored thereon that when executed, the instructions cause a programmable device to:
detect one or more micro-architectural morphing events of a code at a Central Processing Unit (CPU) using hardware level data associated with the code execution at the CPU;
direct a processor to count occurrence of the one or more micro-architectural morphing events to determine if a morphing threshold value is met;
if the morphing threshold value is met, scan a memory space at one or more memory locations substantially corresponding to the code to detect a malware presence;
generate a signal to notify an antivirus software of the identified malware;
wherein the memory space is scanned by a co-processor and wherein the processor and the co-processor are functionally coupled;
wherein the co-processor is external to the CPU while being on the same die as the CPU.

10. The medium of claim 9, wherein the micro-architectural morphing event is triggered at a hardware-level of the processor.

11. The medium of claim 9, wherein the programmable device is further programmed with instructions to monitor performance of the processor as caused by the one or more morphing events.

12. The medium of claim 9, wherein the one or more morphing event comprises a branch misprediction, a Return- or Jump-Oriented programming event, machine pipeline resets, writes to data in instruction-cache.

13. The medium of claim 9, wherein the programmable device is further programed with instructions to scan the memory space through an independent co-processor.

14. The medium of claim 13, wherein the co-processor is programed with instructions to avoid scanning previously-scanned memory.

15. The medium of claim 9, wherein the co-processor is further programed with instructions to scan a newly-added code or a Just-In-Time code apriori.

16. The medium of claim 9, wherein the co-processor is further programmed with instructions to limit the scan duration or to terminate the scan after a time period.

17. The medium of claim 9, wherein the co-processor is one of a Graphic Processor Unit (GPU), Field-Programmable Gate Arrays (FPGA), Converged Security and Manageability Engine (CSME) or a dedicated Security Offloading Co-processor.

18. The medium of claim 9, wherein the signal to notify an antivirus software is an interrupt signal.

19. The medium of claim 9, wherein the co-processor is configured to limit the scan duration or to terminate the scan after a duration.

20. A method to detect presence of a micro-architectural morphing malware in a program code, the method comprising:
detecting one or more micro-architectural morphing events of the code at a central processing unit (CPU) as a function of hardware level data associated with the execution of code at the CPU;
at a processor, counting occurrence of the one or more micro-architectural morphing events at the CPU to determine if a micro-architectural morphing threshold value is met; if the micro-architectural morphing threshold value is met, scanning, using a co-processor, a memory space at one or more memory locations substantially corresponding to the code to detect a malware presence; and
generating an interrupt signal to notify an antivirus software of the identified malware; wherein the co-processor is external to the CPU while being on the same die as the CPU; and
wherein a branch misprediction is used to detect the one or more micro-architectural morphing events.

21. The method of claim 20, wherein the co-processor is one of a Graphic Processor Unit (GPU), Field-Programmable Gate Arrays (FPGA), Converged Security and Manageability Engine (CSME).

22. The method of claim 20, further comprising the co-processor signaling an antivirus program when detecting the malware.

23. The method of claim 20, wherein the micro-architectural morphing event comprises a branch misprediction, a Return- or Jump-Oriented programming event, machine pipeline resets, writes to data in instruction-cache.

24. The method of claim 20, further comprising scanning a memory space at one or more memory locations substantially corresponding to the code causing the micro-architectural morphing event.

25. The method of claim 20, further comprising not scanning a previously-scanned memory region.

26. The method of claim 20, further comprising scanning a newly-added code or a Just-In-Time code apriori.

27. The method of claim 20, further comprising limiting the scanning duration or terminating the scanning after a duration.

* * * * *